US010037516B2

(12) United States Patent
Mardikar et al.

(10) Patent No.: US 10,037,516 B2
(45) Date of Patent: Jul. 31, 2018

(54) SECURE TRANSACTIONS USING A POINT OF SALE DEVICE

(71) Applicant: PAYPAL, INC., San Jose, CA (US)

(72) Inventors: Upendra Mardikar, San Jose, CA (US); Rene Aeberhard, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 750 days.

(21) Appl. No.: 14/146,854

(22) Filed: Jan. 3, 2014

(65) Prior Publication Data

US 2014/0122265 A1    May 1, 2014

Related U.S. Application Data

(63) Continuation of application No. 12/571,290, filed on Sep. 30, 2009, now Pat. No. 8,630,907.

(51) Int. Cl.
*G06Q 20/00*    (2012.01)
*G06Q 20/20*    (2012.01)
(Continued)

(52) U.S. Cl.
CPC ....... *G06Q 20/20* (2013.01); *G06F 17/30879* (2013.01); *G06K 19/0723* (2013.01); *G06Q 20/10* (2013.01); *G06Q 20/202* (2013.01); *G06Q 20/204* (2013.01); *G06Q 20/206* (2013.01); *G06Q 20/382* (2013.01); *G06Q 20/385* (2013.01); *G06Q 20/40* (2013.01); *G06Q 20/401* (2013.01); *G06Q 20/4016* (2013.01); *H04L 9/3228* (2013.01); *H04L 9/3247* (2013.01);
(Continued)

(58) Field of Classification Search
CPC .... G06Q 20/20; G06Q 20/204; G06Q 20/202; G06Q 20/322; G06Q 20/3278; G06Q 20/206; G06Q 20/382
USPC .......................................................... 705/17
See application file for complete search history.

(56) References Cited

U.S. PATENT DOCUMENTS

2004/0029669 A1    2/2004 Khan et al.
2004/0230536 A1    11/2004 Fung et al.
(Continued)

OTHER PUBLICATIONS

Paasch, Carsten A. W. Credit card fraud detection using artificial neural networks tuned by genetic algorithms. Hong Kong University of Science and Technology (Hong Kong), ProQuest Dissertations Publishing, 2008.*
(Continued)

*Primary Examiner* — Florian M Zeender
*Assistant Examiner* — Fawaad Haider
(74) *Attorney, Agent, or Firm* — Haynes and Boone, LLP

(57) ABSTRACT

Systems and methods are provided for secure transactions according to one or more embodiments. According to an embodiment, a method for providing secure transactions comprises initiating a transaction via a point of sale device having a one time password generator. The method also comprises generating at least one password by the point of sale device. The method further comprises associating the at least one password with account information. The method further comprises transmitting the password associated with the account information to a remote location. If the transmitted password matches predetermined associated information at the remote location, the method further comprises confirming the transaction.

18 Claims, 3 Drawing Sheets

(51) Int. Cl.
  *G06Q 20/40* (2012.01)
  *G06K 19/07* (2006.01)
  *G06Q 20/10* (2012.01)
  *G06F 17/30* (2006.01)
  *G06Q 20/38* (2012.01)
  *H04L 9/32* (2006.01)

(52) U.S. Cl.
  CPC .... *H04L 2209/56* (2013.01); *H04L 2209/805* (2013.01)

(56) References Cited

U.S. PATENT DOCUMENTS

| | | |
|---|---|---|
| 2006/0219776 A1 | 10/2006 | Finn |
| 2008/0222038 A1 | 9/2008 | Eden et al. |
| 2009/0172402 A1 | 7/2009 | Tran |
| 2009/0200371 A1 | 8/2009 | Kean et al. |
| 2009/0204545 A1 | 8/2009 | Barsukov |
| 2010/0274677 A1 | 10/2010 | Florek et al. |

OTHER PUBLICATIONS

Diss, Chavan, Kaushik Prakash, "New server-centric authentication protocols for RFID applications with simulation based analysis", Northeastern University, ProQuest, UMI Dissertations Publishing, 2008.

\* cited by examiner

SECURE TRANSACTIONS USING A POINT OF SALE DEVICE

CROSS REFERENCE TO RELATED APPLICATION

This application is a continuation of Ser. No. 12/571,290, filed Sep. 30, 2009, which is incorporated herein by reference in its entirety.

BACKGROUND

Technical Field

Embodiments of the present disclosure generally relate to secure transactions, and more particularly, to methods and systems for secure financial transactions using one or more point of sale devices and passwords, PINs or passcodes for authentication.

Related Art

Financial transactions such as purchases made online or over the Internet are widely used and continue to grow in popularity. However, such financial transactions may introduce fraud and security concerns as a result of a seller not being able to physically identify a purchaser and verify that the purchaser is entitled to use a selected form of payment.

Financial transactions in general require some type of identity authentication to verify that a purchaser is authorized to conduct such a transaction. To address fraud and security concerns of financial transactions, "two-factor authentication" systems have been introduced in connection with online and Internet purchases as well as for in-person purchases at a point of sale (POS) location. Two-factor authentication systems require that a purchaser submit two unique forms of identification associated with the particular form of payment selected by the purchaser. For example, a purchaser may be required to present a primary account number (PAN) as well as a personal identification number (PIN).

One effective second authentication factor may include the use of a card, for example, a credit card, that can display a "One-Time PIN/Password" or "OTP". An OTP is similar to a traditional static password in that it may be used along with a username or a PAN, however, an OTP is dynamically generated. At each session, a purchaser may use the card displaying a unique multi-digit PIN or password. In subsequent sessions, yet another unique PIN or password is generated. These PINS or passwords may be synchronized with a central server so that a purchaser is authenticated as an authorized purchaser.

An OTP may provide a higher level of security than a static password, PIN or other identifier. However, a need exists for improved methods and systems for financial transactions with increased security features.

SUMMARY

As will be further described herein in relation to one or more embodiments, methods and systems are provided for financial transactions using a point of sale device wherein security is enhanced while meeting a need for convenient, friendly and confidential payment exchanges within a trusted environment.

In accordance with an embodiment of the disclosure, a method for providing secure transactions comprises initiating a transaction via a point of sale device having a password generator. The method also comprises generating at least one password by the password generator of the point of sale device. The method also comprises associating the at least one password with account information. The method further comprises transmitting the at least one password associated with the account information to a remote location. If the transmitted password matches predetermined associated information maintained at the remote location, the method also comprises confirming the transaction.

In accordance with another embodiment of the disclosure, a point of sale device comprises: one or more processors; and one or more memories adapted to store a plurality of machine-readable instructions which when executed by the one or more processors are adapted to cause the point of sale device to: read information related to a user's selected form of payment, generate at least one password associated with the read information, and transmit the at least one password to a remote location.

In accordance with another embodiment of the disclosure, a secure transaction system comprises a point of sale device in communication with a remote location via a network. The system also comprises one or more processors and one or more memories adapted to store a plurality of machine-readable instructions. When executed by the one or more processors, the machine-readable instructions are adapted to cause the secure transaction system to facilitate a transaction initiated via the point of sale device having a password generator; receive at least one password generated by the point of sale device; associate the at least one password generated by the point of sale device with account information; if the transmitted password matches predetermined associated information, authorizing the financial transaction.

In accordance with another embodiment of the disclosure a method for providing secure transactions comprises initiating a transaction via a point of sale (POS) device using a user-selected form of payment. The method also comprises reading information from the user-selected form of payment, wherein the read information comprises at least a password, account information and a digital signature of the user-selected form of payment. The method also comprises generating at least one POS password associated with the information read from the user-selected form of payment. The method further comprises transmitting information to a remote location wherein the transmitted information comprises at least the information read from the user-selected form of payment, the at least one POS password and a POS digital signature; and confirming the transaction if the transmitted information matches predetermined associated information maintained at the remote location.

These and other features and advantages of the embodiments of the present disclosure will be more readily apparent from the detailed description of the embodiments set forth below taken in conjunction with the accompanying drawings.

BRIEF DESCRIPTION OF THE FIGURES

Like element numbers in different figures represent the same or similar elements.

DETAILED DESCRIPTION

In accordance with one or more embodiments described herein, methods and systems are provided for secure transactions such as financial transactions at a point of sale (POS) location using passwords, PINs or passcodes. In financial transactions where a purchaser desires to pay for goods and/or services, a terminal or point of sale (POS) device may be used by a merchant or service provider to process the payment. The terminal or POS device is able to generate a password, PIN or passcode such as a one time password (OTP) based on, for example, a user's account information and/or the particular merchant's terminal information. The password, PIN or passcode may then be sent for payment verification from the terminal or POS device to a remote location, for example, a payment service provider, and may be matched with predetermined information maintained at the remote location. If there is a match, then the financial transaction is confirmed. If there is no match, then the financial transaction is rejected.

In addition, the terminal or POS device may read a password, PIN or passcode such as an OTP from a user's transaction card (e.g., a credit card) having the OTP as well as account information such as a primary account number (PAN) along with a digital signature of the transaction card. The terminal or POS device may also generate a POS password, PIN or passcode such as an OTP and a POS digital signature. The terminal or POS device may then send the transaction card's account information, the card's OTP and the card's digital signature as well as the POS's OTP and digital signature to a remote location, for example, to a payment service provider, for verification or confirmation over an Omnibus or over a network. The OTP and digital signature combination information provides added security against potential fraudulent use. In one or more embodiments described herein, transactions at a terminal or POS device using passwords, PINs or passcodes may be performed in a secure manner while avoiding potential payment disputes.

Figure 1:
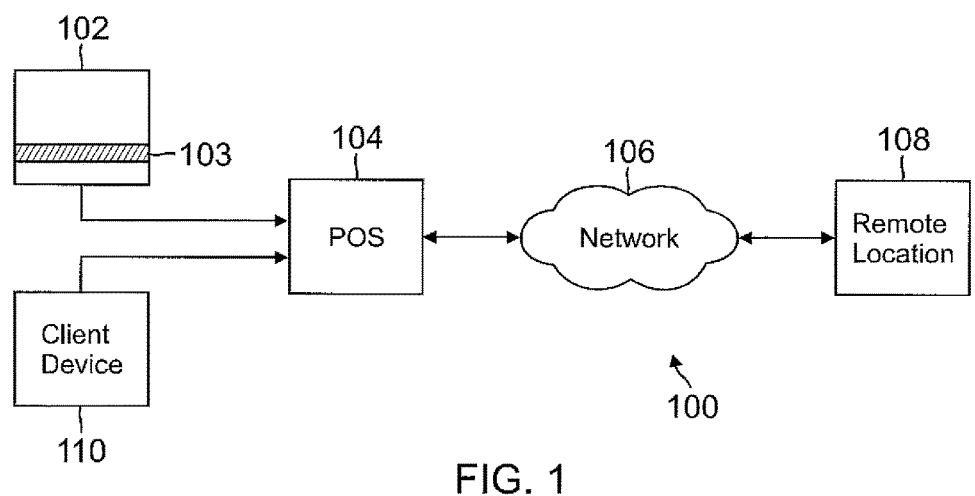
FIG. 1 is a block diagram illustrating a system for processing financial transactions according to an embodiment of the present disclosure.

Referring now to the drawings wherein the showings are for purposes of illustrating embodiments of the present disclosure only, and not for purposes of limiting the same, FIG. 1 is a block diagram illustrating a system for processing financial transactions according to an embodiment of the present disclosure.

In system 100, a user desiring to purchase goods and/or services may select to pay for such goods and/or services with a transaction card 102. Transaction card 102 may be, for example, a smart card, or a traditional credit card or debit card issued by a financial institution. Transaction card 102 may include account information that may be printed on a front portion of the transaction card 102. Account information may include, for example, a personal account number (PAN), an expiration date, a security code and/or the name of an authorized user. This account information may also be stored on a magnetic stripe 103 that may be located on a back portion of the transaction card 102. When the user presents transaction card 102 to a salesperson at a merchant's location to pay for goods and/or services, the salesperson may swipe transaction card 120 on a magnetic stripe card reader included in a merchant's terminal or point of sale device (POS) 104. In other embodiments, magnetic stripe 103 of transaction card 102 may be replaced by, or be provided in addition to, a near field communications (NFC) transponder including, for example, an RFID chip, a contactless smart card, etc. In this case, POS 104 may read the transaction card's information via use of the NFC transponder. Transaction card 102 may also include a display capable of displaying alphanumeric characters, graphics, etc. Such display may be an electro-optic display such as a flexible LCD screen, a light emitting polymer display, etc. as generally known in the art.

In one or more embodiments, transaction card 102 may generate a password such as a one time password (OTP) as well as a digital signature of transaction card 102. Transaction card 102 may include a processor configured to provide OTPs to magnetic stripe 103, to the card's NFC transponder and/or to the display of transaction card 102.

Alternatively, a user desiring to purchase goods and/or services may select to pay for such goods and/or services using a client device 110 at POS 104. Client device 110 may be implemented using any appropriate combination of hardware and/or software configured for wired and/or wireless communication over a network. For example, client device 110 may be implemented as a wireless telephone, a personal digital assistant (PDA), a key fob, a smart card, a notebook computer and/or other types of computing devices. In one embodiment, client device 110 may be implemented as a personal computer of a user in communication with the Internet or another network.

Client device 110 may include an Application component or block (Application block) where applications may be loaded. One application that may be loaded in the Application block is a mobile payment application wherein client device 110 is adapted to be used as a mobile wallet. Client device 110 may also include an RFID device, Bluetooth, a near field communication (NFC) transponder or an infrared communication device to communicate account information to POS 104 that may be stored in the mobile wallet of client device 110 upon initiation of a transaction. Account information may include a PAN, expiration date and a password or personal identifier such as a personal identification number (PIN). In one or more embodiments, client device 110 may generate passwords such as OTPs and have a digital signature particular to client device 110.

It should be appreciated that components of client device 110 including the Application block may also include a Secure Element (SE), a Universal Integrated Circuit Card (UICC) with a Subscriber Identity Module (SIM) application, smart cards or other suitable devices.

The Application block may also include other pre-loaded applications, for example, a payment service provider application to facilitate financial transactions. In addition, client device 110 may include various applications as may be desired in particular embodiments to provide desired features to client device 110.

Client device 110 may further include identification information such as, for example, a Secure Element number or identification (ID), the client device's unique identifier number such as an International Mobile Equipment Identity (IMEI) number, or a unique number associated with a user of a client device such as an International Mobile Subscriber Identity (IMSI) number, which may be stored inside the client device, for example, in a component such as an SE, a UICC/SIM card, a smart card or any other suitable card of the client device. One or more user identifiers may be implemented, for example, as operating system registry entries, cookies associated with a browser application, identifiers associated with hardware of client device 110, or other appropriate identifiers.

Upon a user's selection of a form of payment, for example, by a transaction card 102 or a client device 110, POS 104 may initiate a connection to a remote location 108, which may include for example a payment service provider, via a network 106. POS 104 is adapted to generate at least one password, PIN or passcode such as a one time password (OTP) upon initiation of a transaction as will be described in more detail below according to one or more embodiments. The password, PIN or passcode generated by POS 104 may be associated with information read by POS 104 such as account information from, for example, magnetic stripe 103 of transaction card 102, or received by POS 104 from client device 110. POS 104 may then transmit the generated password and associated account information via network 106 to remote location 108.

Furthermore, in one or more embodiments, transaction card 102 or client device 110 may be configured to generate a password such as a one time password (OTP) as well as a digital signature. As is known in the art, digital signatures are provided to authenticate the sender of information, for example, in this case, the transaction card or the client device. The importance of high confidence in sender authenticity is especially obvious in a financial context. POS 104 may be adapted to read such OTPs and digital signatures along with other account information from the form of payment selected by the user. POS 104 may also transmit the digital signature and OTPs generated by transaction card 104 or client device 110 to remote location 108.

In addition, transaction information including a merchant identifier, a terminal identifier, a date, a time, a payment amount, etc. may be transmitted to remote location 108 by POS 104. Remote location 108 may store some of the received account and/or transaction information and authenticate the password generated and received from POS 104 according to the account/transaction information. The transaction may be confirmed or rejected depending on whether the received information, for example, a one time password, matches pre-determined information maintained at remote location 108. In one embodiment, a user identifier may be used by remote location 108 to associate transaction card 102 or client device 110 (or correspondingly the user) with a particular account maintained by remote location 108. Once confirmed, remote location 108 may send a confirmation message to POS 104 indicating that the transaction has been authenticated. Conversely, if the transaction is rejected, remote location 108 may reply that the transaction was denied.

Remote location 108 may include a payment service provider such as PayPal, Inc. of San Jose, Calif., or one or more financial institutions, or a respective intermediary that may provide multiple POS devices at various locations to facilitate transaction routings between merchants and, for example, financial institutions. Remote location 108 may maintain data or information related to, for example, account information, passwords, PINs, passcodes, merchant or terminal identifiers, and/or client device information such as client device identifiers. For example, an OTP generated by POS 104 may be associated with an account number or a name or a client device identifier as well as with a merchant or terminal identifier. An OTP may also be associated with a unique account or with a unique client device (having multiple accounts). Data or information may be stored according to various schemes for coordinating accounts, passwords, PINs or passcodes, client devices and merchant information.

POS 104, transaction card 102, client device 110 and remote location 108, for example, a payment service provider, may each include one or more processors, memories, and other appropriate components for executing instructions such as program code and/or data stored on one or more computer readable mediums to implement the various applications, data, and methods described herein. For example, such instructions may be stored in one or more computer readable mediums such as memories or data storage devices internal and/or external to various components of the system, and/or accessible over network 106, which may be implemented as a single network or a combination of multiple networks. For example, in various embodiments, a network may include the Internet or one or more intranets, landline networks, wireless networks, and/or other appropriate types of networks.

Figure 2:
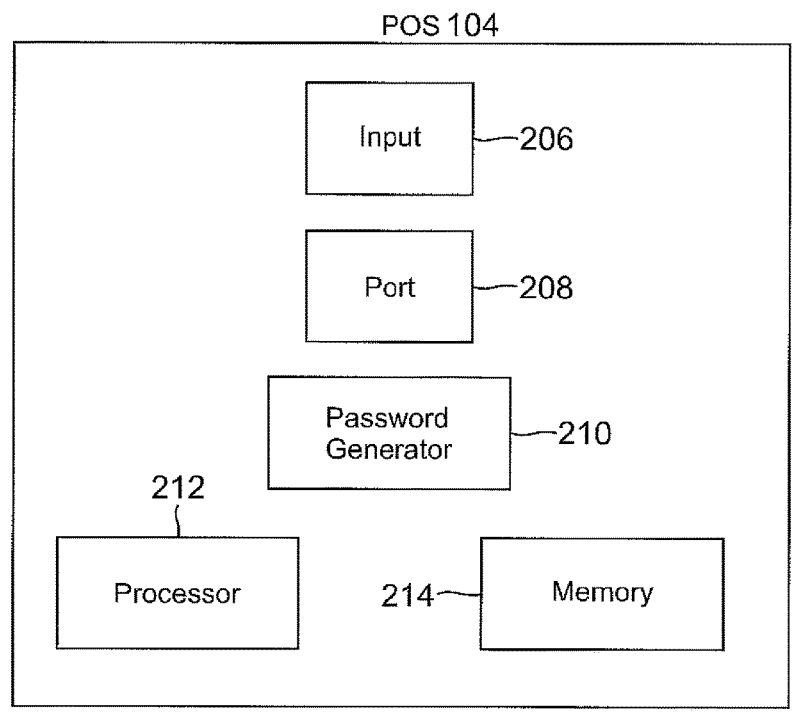
FIG. 2 is a block diagram illustrating components inside a terminal or point of sale (POS) device according to an embodiment of the present disclosure.

Referring now to FIG. 2, a block diagram illustrating components inside a terminal or point of sale (POS) device is provided according to an embodiment of the present disclosure.

Point of sale device (POS) 104 may include various components, for example, at least an input 206, a port 208, a password generator 210, a processor 212 and a memory 214. Processor 212 may be communicatively connected and adapted to control the components of POS 104 according to, for example, software commands stored in memory 214.

Input 206 of POS 104 is adapted to receive data such as account information necessary to support a transaction. For example, input 206 may include a keypad or a keyboard for manually entering transaction information such as a PAN, a money amount, a password, etc. Input 206 may also include a magnetic stripe reader, an RFID chip, Bluetooth, an NFC transponder, an IR communications reader, etc. in order to receive data from a transaction card 104, a client device 110, or the like. In addition, input 206 is adapted to read a password, PIN or passcode such as an OTP generated by the form of payment selected by the user, for example, transaction card 102 or client device 110. Furthermore, input 206 of POS 104 may be adapted to read a digital signature of the selected form of payment, which may enhance the security of a transaction.

Port 208 may be adapted to facilitate communications for POS 104, for example, wired or wireless communications, communications via antennas, Internet, or other network communications.

According to one or more embodiments, password generator 210 of POS 104 is adapted to generate passwords, PINs or passcodes, including one-time passwords, PINs or passcodes (OTPs). Upon an initiation of a transaction at POS 104, POS 104 interacts with the form of payment selected by the user, for example, by swiping a transaction card or by a Near Field Communications (NFC) transponder for a client device. Processor 212 of POS 104 causes password generator 210 to generate a password, PIN or passcode such as an OTP associated with account information read from the form of payment selected by the user, for example, a transaction card or a client device, as well as with transaction information including, for example, merchant or terminal identifier information. The associated password, PIN or passcode may then be transmitted to a remote location 108 via a network. Passwords, PINs or passcodes such as OTPs may be automatically generated in a random manner, by an algorithm using one or more unique features related to a device, or they may also be generated based on pre-determined information. OTPs may be updated regularly based on, for example, time with an expiration or a time stamp. POS 104 may generate passwords, PINs or passcodes for different accounts, users or client devices.

POS 104 may be any physical device at any location where a user may make a payment for purchased goods and/or services. POS 104 may generally be located at a merchant's establishment where a salesperson operates POS 104. Alternatively, the user may self operate the POS 104, for example, at vending machines, ATMs, ticket dispensers, etc. In one example, POS 104 may be implemented as a phone-based POS wherein a merchant may use a wireless telephone to receive payment. Other examples of POS 104 include virtual terminals, personal computers, notebook computers, cash registers or any other devices that are adapted to read a magnetic stripe, an RFID chip, Bluetooth, NFC, IR communications, etc. from a transaction card 104, a client device 110, or the like.

Figure 3:
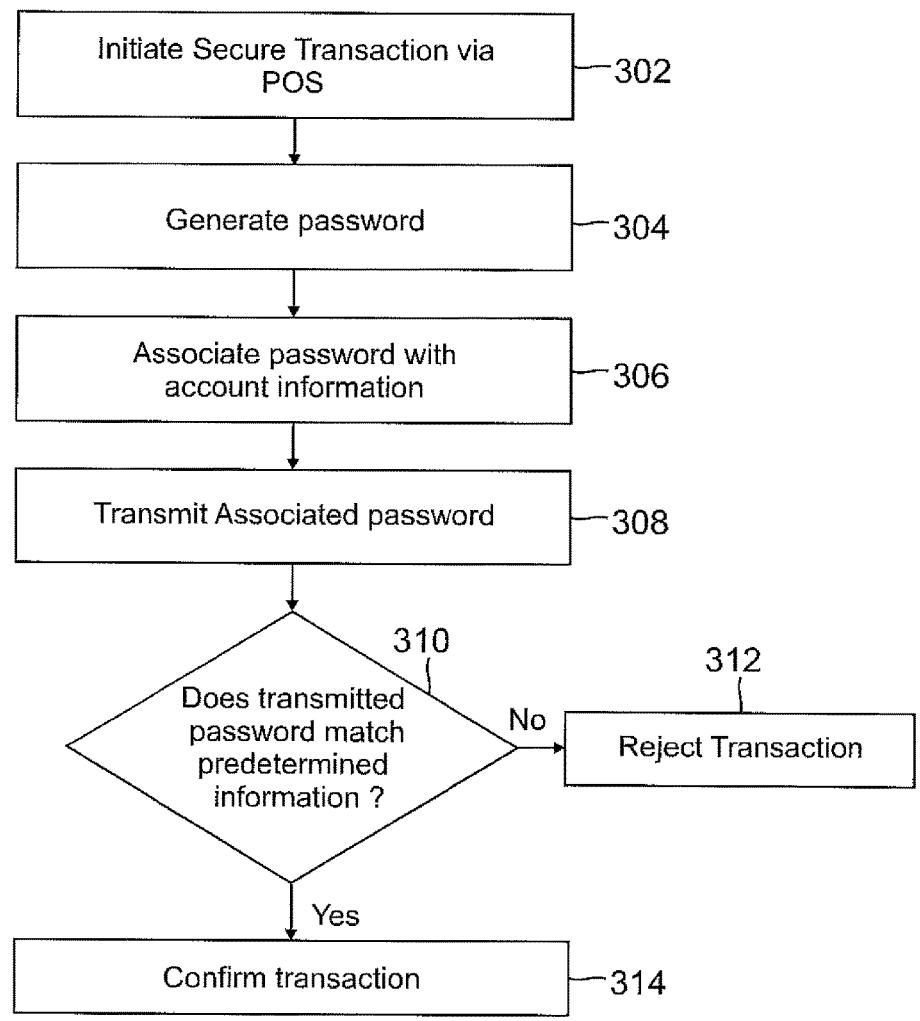
FIG. 3 is a flowchart for a secure financial transaction according to an embodiment of the present disclosure.

Referring now to FIG. 3, a flowchart for a secure financial transaction is illustrated according to an embodiment of the present disclosure. FIG. 3 may be implemented by the system of FIG. 1 and the POS device of FIG. 2 according to one or more embodiments.

In block 302, a secure transaction such as a financial transaction may be initiated upon a user selecting and using a form of payment such as a transaction card or a client device via a POS device. In an example, the user may approach a salesperson at a merchant's location to pay for certain goods and/or services using, for example, a transaction card such as a credit card or a client device such as a mobile telephone. The salesperson would generally use a POS device to process the payment, for example, by swiping a credit card through a magnetic stripe reader of the POS, or by using an NFC reader of the POS to read payment and account information from the mobile telephone.

In block 304, a password, PIN or passcode such as a one time password, PIN or passcode (OTP) is generated by a password generator of the POS device. For example, one time passwords may be generated at predetermined time intervals. Passwords, PINs or passcodes may be automatically generated for a specific account or for a specific form of payment selected by the user using random numbers or other appropriate identification tokens, or using the OATH open standard as is known in the art.

In block 306, the generated password, PIN or passcode is associated with account or transaction information including for example, a primary account number (PAN), a name, a phone number, an email address, a client device identifier, a POS identifier, a merchant identifier, etc.

In block 308, the associated password, PIN or passcode is transmitted to a remote location via a network.

In block 310, the transmitted associated password is compared with predetermined information at the remote location. The remote location is adapted to identify a particular account, user, client device, merchant identifier, terminal or POS associated with the received password based on pre-determined or pre-registered information maintained therein. For instance, the remote location may maintain a database associating, at least, financial accounts, passwords and specific devices. In an example, an account number may be associated with a password and a form of payment selected by the user including a client device identifier, a mobile telephone number, or the like.

In block 312, if the transmitted associated password does not match the predetermined associated information at the remote location, the financial transaction is rejected. For instance, if the transmitted associated password does not match, for example, an account number, a telephone number, a money amount limit, etc., as maintained in a database at the remote location, the remote location may send a message to the POS so that the transaction is rejected.

In block 314, if the transmitted associated password matches predetermined associated information at the remote location, the financial transaction is confirmed. For instance, if the transmitted associated password matches, for example, an account number, a telephone number, a money amount limit, etc., as maintained in a database at the remote location, the remote location may send a message to the POS so that the transaction is confirmed.

According to one or more embodiments of the present disclosure, a strong second factor authentication may be provided to verify the authenticity of a transaction card, a client device, a user, a merchant, etc. For example, a payment service provider may compare a one time password generated by a POS with pre-registered identification information for a particular user, a particular client device or a particular merchant (also referred to as an identifier).

Identification information for a particular user, client device or merchant may be set during pre-registration with the remote location. According to one or more embodiments, it is assumed that a user or a merchant has previously registered with the remote location, for example, to open an account. In this regard, it will be appreciated that the user or merchant may have previously provided account information to the remote location, for example, over network 106 through, for example, a secure connection between client device 110 or POS 104 and remote location 108. Alternatively, client device 110 or POS 104 may be personalized during customization by operators, customizers and/or device manufacturers.

As a result of such previous registration, client device 110 or POS 104 stores a specific user or merchant identifier, respectively, that may be used to identify the particular user or merchant as having an account maintained by remote location 108. The user or merchant identifier may be implemented, for example, as one or more cookies, operating system registry entries, hardware identifiers, or other types of identifiers.

When a transaction, for instance a financial transaction using a payment service provider such as PayPal, Inc. with client device 110 or transaction card 102, the payment service provider gets signature information of, for example, a X509 certificate. This X509 signature information is typically maintained for each user. The signature information may be a digital signature and may include a time stamp, dollar amount, transaction type, item, and location, which may be determined from a GPS enabled client device 110. Signature information may also be preloaded in client device 110 as EMV (Europay, MasterCard, Visa), or ECC, in addition to X509.

Figure 4:
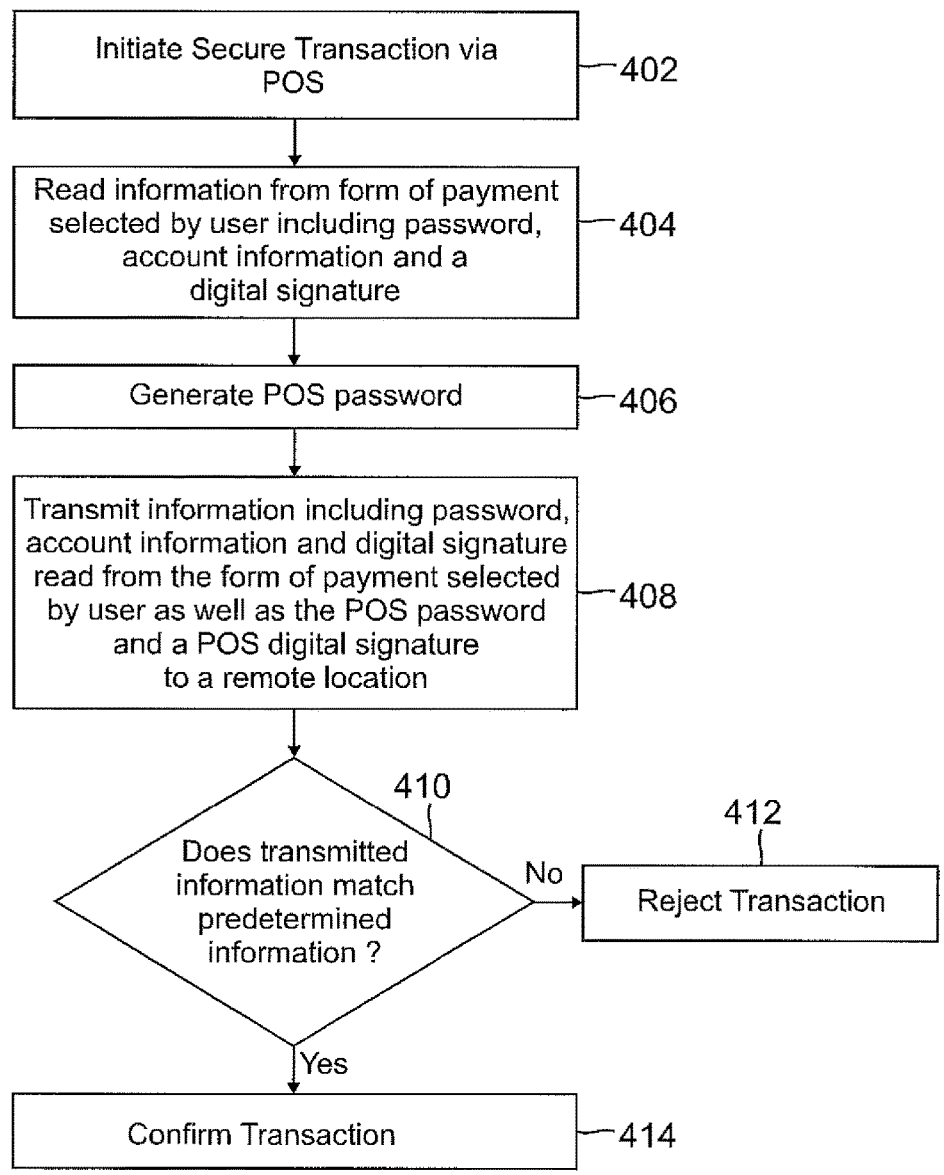
FIG. 4 is a flowchart for a secure financial transaction according to another embodiment of the present disclosure.

Referring now to FIG. 4, a flowchart for a secure financial transaction according to another embodiment of the present disclosure is provided. FIG. 4 may be implemented by the system of FIG. 1 and the POS device of FIG. 2 according to one or more embodiments.

In block 402, as described above according to one or more embodiments, a secure transaction such as a financial transaction may be initiated upon a user selecting and using a form of payment such as a transaction card or a client device via a POS device.

In block 404, the POS device is adapted to receive or read information from a form of payment selected by a user such as a transaction card, a client device, etc. The information read from the form of payment selected by the user may include, at least, account information and a password, PIN or passcode such as an OTP associated with or generated by the form of payment selected by the user. The POS device is also adapted to receive or read a digital signature corresponding to the form of payment selected by the user.

In block 406, as described above according to one or more embodiments, a password, PIN or passcode such as a one time password, PIN or passcode (OTP) is generated by a password generator of the POS device. This POS password, PIN or passcode may be generated based on particular information including information received or read from the form of payment selected by the user as well as unique information related to the merchant or the POS device itself. It should be noted that the POS device may also have a POS digital signature associated therewith.

In block 408, the POS device is adapted to transmit information including the POS generated password, PIN or passcode and the POS digital signature to a remote location, for example, a payment service provider. In addition, the POS device is adapted to transmit the password, PIN, or passcode, account information and digital signature received or read from the form of payment selected by the user to the remote location.

In block 410, the transmitted information is compared with predetermined information at the remote location. As described above according to one or more embodiments, the remote location is adapted to authenticate a particular digital signature, account, user, client device, merchant identifier, terminal, POS device identifier, or the like, associated with the transmitted information based on pre-determined or pre-registered information maintained therein.

In block 412, if the transmitted information does not match the predetermined associated information at the remote location, the financial transaction is rejected.

In block 414, if the transmitted combination information matches predetermined associated information at the remote location, the financial transaction is confirmed.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. It is contemplated that various alternate embodiments and/or modifications to the present disclosure, whether explicitly described or implied herein, are possible in light of the disclosure. For example, although financial transactions have been described according to one or more embodiments, it should be understood that the present disclosure may also apply to transactions where requests for information, requests for access, or requests to perform certain other transactions may be involved.

Having thus described embodiments of the disclosure, persons of ordinary skill in the art will recognize that changes may be made in form and detail without departing from the scope of the disclosure. Thus the disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
   receiving, from a point of sale (POS) device of a merchant, transaction authorization information for a transaction between the merchant and a user, the transaction authorization information comprising a plurality of One-Time Passwords (OTPs), the plurality of OTPs including:
      a merchant One-Time Password (OTP) generated by the POS device of the merchant, wherein the merchant OTP corresponds to merchant account information and a unique merchant identifier associated with the merchant, the unique merchant identifier assigned during a first pre-registration process involving a first secure network connection made by the merchant, wherein the merchant OTP is generated by a password generator component of the POS device based on information read from a form of payment selected by the user; and
      a user OTP transmitted from a client device to the POS device, the user OTP corresponding to a unique user identifier associated with the user, the unique user identifier assigned during a second pre-registration process involving a second secure network connection made by the user, wherein the unique user identifier includes a client device identifier associated with hardware of the client device;
   wherein the transaction authorization information further comprises a password read by the POS device, wherein the password is generated based on a form of payment selected by the user to pay for goods and/or services, and a digital signature of the form of payment;
   comparing the received transaction authorization information to determine if it matches predetermined information including the unique merchant identifier and the unique user identifier obtained through the first and second pre-registration processes;
   confirming the transaction if the received transaction authorization information matches the unique merchant identifier and the unique user identifier including at least one of a primary account number (PAN), an address, a location, a time, a Secure Element number or identification (ID), an International Mobile Equipment Identity (IMEI) number of the client device, or a user-associated International Mobile Subscriber Identity (IMSI) unique number stored in a component inside the client device; and
   based on results of the comparing, determining whether to authorize the transaction between the merchant and the user.

2. The system of claim 1, wherein the POS device is provided by a service provider.

3. A method comprising:
   receiving, electronically by an authorization computer system, transaction authorization information for a transaction between a merchant and a user, the transaction authorization information comprising a plurality of One-Time Passwords (OTPs), the plurality of OTPs including:
- a merchant One-Time Password (OTP) generated by a point of sale (POS) device having an OTP generator, wherein the merchant OTP is received in connection with a transaction authorization request for the transaction being conducted via the POS device, wherein the merchant OTP is associated with merchant account information and a unique merchant identifier, the unique merchant identifier assigned during a first pre-registration process involving a first secure network connection made by the merchant, wherein the merchant OTP is generated by a password generator component of the POS device based on information read from the form of payment selected by the user; and
- a user OTP transmitted from a client device to the POS device, the user OTP corresponding to a unique user identifier associated with the user, the unique user identifier assigned during a second pre-registration process involving a second secure network connection made by the user, wherein the unique user identifier includes a client device identifier associated with hardware of the client device;
- wherein the transaction authorization information further comprises a password read by the POS device, wherein the password is generated based on the form of payment selected by the user to pay for goods and/or services, and a digital signature of the form of payment;

determining, electronically by the authorization computer system, if the transaction should be approved based on whether the received transaction authorization information matches predetermined information including the unique merchant identifier and the unique user identifier obtained through first and second pre-registration processes;

confirming the transaction if the received transaction authorization information matches the unique merchant identifier and the unique user identifier including at least one of a primary account number (PAN), an address, a location, a time, a Secure Element number or identification (ID), an International Mobile Equipment Identity (IMEI) number of the client device, or a user-associated International Mobile Subscriber Identity (IMSI) unique number stored in a component inside the client device; and transmitting, to the POS device, information indicating whether the transaction is approved.

4. The method of claim 3, wherein the user OTP is associated with a client device identifier associated with hardware of the client device.

5. The method of claim 4, wherein the user OTP is generated by a transaction payment instrument of the user.

6. The method of claim 3, wherein determining whether the transaction should be approved is based on the user OTP.

7. The method of claim 3, wherein the POS device is provided by a service provider.

8. A non-transitory computer readable medium on which are stored computer readable instructions that when executed by a processor of a system, cause the system to perform operations comprising:

receiving transaction authorization information for a transaction between a merchant and a user, the transaction authorization information comprising a plurality of One-Time Passwords (OTPs), the plurality of OTPs including:
- a merchant OTP generated by a point of sale (POS) device of the merchant, wherein the merchant OTP corresponds to merchant account information and a unique merchant identifier associated with the merchant, the unique merchant identifier assigned during a first pre-registration process involving a first secure network connection made by the merchant, and wherein the merchant OTP is generated by a password generator component of the POS device based on information read from a form of payment selected by the user to pay for goods and/or services, and a digital signature of the form of payment;
- a password read by the POS device, wherein the password is generated based on the form of payment selected by the user; and
- a user OTP transmitted from a client device to the POS device, the user OTP corresponding to a unique user identifier associated with the user, the unique user identifier assigned during a second pre-registration process involving a second secure network connection made by the user, wherein the unique user identifier includes a client device identifier associated with hardware of the client device
- wherein the transaction authorization information further comprises a password read by the POS device, wherein the password is generated based on a form of payment selected by the user to pay for goods and/or services, and a digital signature of the form of payment;

comparing the received transaction authorization information to determine if it matches predetermined information including the unique merchant identifier and the unique user identifier obtained through the first and second pre-registration processes;

confirming the transaction if the received transaction authorization information matches the unique merchant identifier and the unique user identifier including at least one of a primary account number (PAN), an address, a location, a time, a Secure Element number or identification (ID), an International Mobile Equipment Identity (IMEI) number of the client device, or a user-associated International Mobile Subscriber Identity (IMSI) unique number stored in a component inside the client device; and based on results of the comparing and the confirming, determining whether to authorize the transaction between the merchant and the user.

9. The system of claim 1, wherein the digital signature of the form of payment includes the location of the client device.

10. The system of claim 9, wherein the location of the client device is determined by a GPS device of the client device.

11. The system of claim 1, wherein the digital signature of the form of payment includes a time stamp.

12. The method of claim 3, wherein the digital signature of the form of payment includes the location of the client device.

13. The method of claim 12, wherein the location of the client device is determined by a GPS device of the client device.

14. The method of claim 3, wherein the digital signature of the form of payment includes a time stamp.

15. The non-transitory computer readable medium of claim 8, wherein the POS device is provided by a service provider.

16. The non-transitory computer readable medium of claim 8, wherein the digital signature of the form of payment includes the location of the client device.

17. The non-transitory computer readable medium of claim 16, wherein the location of the client device is determined by a GPS device of the client device.

18. The non-transitory computer readable medium of claim 8, wherein the digital signature of the form of payment includes a time stamp.

\* \* \* \* \*